United States Patent [19]

Reed, Jr.

[11] Patent Number: 4,643,218

[45] Date of Patent: Feb. 17, 1987

[54] CLEANER AND ACTUATOR DEVICE FOR REMOTE ACCESS VALVE CONTROLS

[76] Inventor: Robert L. Reed, Jr., 781 Forest Ave., Greenwood, Ind. 46142

[21] Appl. No.: 855,423

[22] Filed: Apr. 24, 1986

[51] Int. Cl.⁴ .............................................. F16L 5/00

[52] U.S. Cl. .................................. 137/237; 137/364; 251/291; 134/22.11; 134/166 C; 134/167 C

[58] Field of Search ............... 137/237, 240, 364, 371; 251/291, 292; 15/300 R, 327 R, 329, 344; 134/22.1, 22.11, 22.12, 24, 166 C, 167 C

[56] References Cited

U.S. PATENT DOCUMENTS

| | | | |
|---|---|---|---|
| 1,527,496 | 2/1925 | Tyrrell | 251/291 |
| 2,184,516 | 12/1939 | Coster | 137/364 |
| 2,972,356 | 2/1961 | Reynolds | 137/237 |
| 3,658,589 | 4/1972 | Shaddock | 134/24 |
| 3,963,036 | 6/1976 | Irelan, Jr. | 15/304 |
| 4,040,864 | 8/1977 | Steeves | 134/24 |

*Primary Examiner*—A. Michael Chambers
*Assistant Examiner*—Sheri M. Novack
*Attorney, Agent, or Firm*—Robert A. Spray

[57] ABSTRACT

A cleaner device for cleaning the valve box or cistern which provides remote access to a valve control body of a valve in an underground pipe line, the device having achieving the cleaning by compressed air passing through a tubular body member, and having an upwardly-open basket for catching the debris stirred up by the moving air. A downwardly-opening socket member at the foot of the device, the socket member being slightly oversize as to the valve's control body, both guides the air stream to give a cleaning impingement of the walls of the valve's control body and provides the mechanical component by which the valve-operating torque is applied to the valve's control body; and at the upper end of the tubular body member a deflector disc baffles moving debris back into the valve box or cistern for causing such debris to be collected in the basket.

6 Claims, 7 Drawing Figures

CLEANER AND ACTUATOR DEVICE FOR REMOTE ACCESS VALVE CONTROLS

FIELD OF INVENTION

The present invention relates to and provides a valve actuator having an advantageous means of cleaning debris from an underground valve control body or the like, in which there is a problem of the remoteness of access to the control body; and the invention particularly relates to and achieves a means of cleaning the access to a valve control body of a valve buried beneath the surface in an underground water line.

The problem of cleaning the valve box or cistern of an underground valve has long existed as to many such valve control bodies, because the underground nature of the water pipe installation cause the use of valves which are also in the underground water lines, and the control body or bodies for such valves are likewise usually underground; and the inherent depth of such control bodies of the valves causes the problem of not only remote access but various kinds of debris, such as sand, rocks, gravel, dirty leaves, etc., as fall into or otherwise work their way into, and seem to accumulate in, the vertical access cistern of the installation.

Even if the system has been carefully installed, factors seem to inevitably cause openings which permit entrance of debris; and whether or not any particular ones cause the problem, there are many sources of the problem, e.g., freezing and thawing, tree root growth, a cap being disturbed, imperfect junction of the valve box or cistern tube body with an irregularly-shaped valve, burrowing animals, etc.

As a result of accumulation of debris in such a valve box or cistern, much time and effort is required for a workman to get control-actuation tools to the valve control body in that type of underground or remote access situation, even though the task of manipulating the control body may thereafter be that of an easy rotation, once the valve and its control body have been reached and with no debris to burden the twisting effort.

Not only is there the cost and effort of extra labor involved in getting adequate access to such a buried valve control body, but sometimes there is urgent reason for rapid valve-actuation, as to shut off the line due to a downstream break, etc.

But, whatever be the situation encountered, and whatever be the cause or nature of the debris, the device of the present invention works quite advantageously and conveniently; and it is so convenient to handle and to use that it poses substantially no more operativity bother than any sort of a "long reach" wrench tool, and thus may be conveniently used even in the situation of a workman finding a particular valve box or cistern quite clean of all debris, whenever that happens; and thus the workman not need to bother to carry an extra tool.

BRIEF DESCRIPTION OF PREFERRED EMBODIMENT

In carrying out the invention in a preferred embodiment, an elongated pipe or tube body member is provided of a length for its foot end to reach the underground valve and its control body, while the upper and of the device is being manually held by a workman standing on the ground; and the foot end of the pipe or tube carries an upwardly-open basket.

Means are provided for applying compressed air to the interior or bore of the pipe or tube, and the air causes the debris to move about in the valve box, eventually falling into the basket and thus being caught out of the way.

The extreme lower end of the pipe or tube carries a downwardly-opening socket, of a polygonal shape corresponding to the shape (usually square) of the valve control body (often called a "key nut") but it is slightly larger in size than the key nut body to provide clearance sufficient to cause and permit a stream of the compressed air to flow past the walls of the key nut body, achieving a cleaning action as the moving stream of air impinges against and flows along the surface of the key nut. (Any water, which often has found its way into the lower portion of the valve box, is automatically utilized in the procedure, without need of a purposeful supply; and if existing, helps in the cleaning effort by help in the achieving of a sort of a scrubbing effect.) The socket is not so large however, as to cause a problem of slipping as to the key nut; and the socket provides the mechanical means of applying the control twisting or torque to the valve's key nut body.

A resilient deflector disk is carried by the pipe or tube adjacent its upper end, baffling any debris from injuring, or soiling clothing of, the workman; and debris deflected from such disc falls back into the valve box and is ultimately caught in the basket.

When sufficient cleaning has been achieved for the workman to feel that the socket has sufficiently engaged the control valve body, he shuts off the compressed air, performs the desired control manipulation of the valve, removes the device, and discards whatever has accumulated in the basket.

The above description of the novel signboard mounting is of somewhat introductory and generalized form. More particular details, concepts, and features are set forth in the following and more detailed description of an illustrative embodiment, taken in conjunction with the accompanying drawings.

BRIEF DESCRIPTION OF THE DRAWINGS

The accompanying drawings are of somewhat schematic and diagrammatic nature, for showing of the inventive concepts as well as illustrating the use of the components of the device; and in the drawings.

DETAILED DESCRIPTION OF PREFERRED EMBODIMENT

Figure 1:
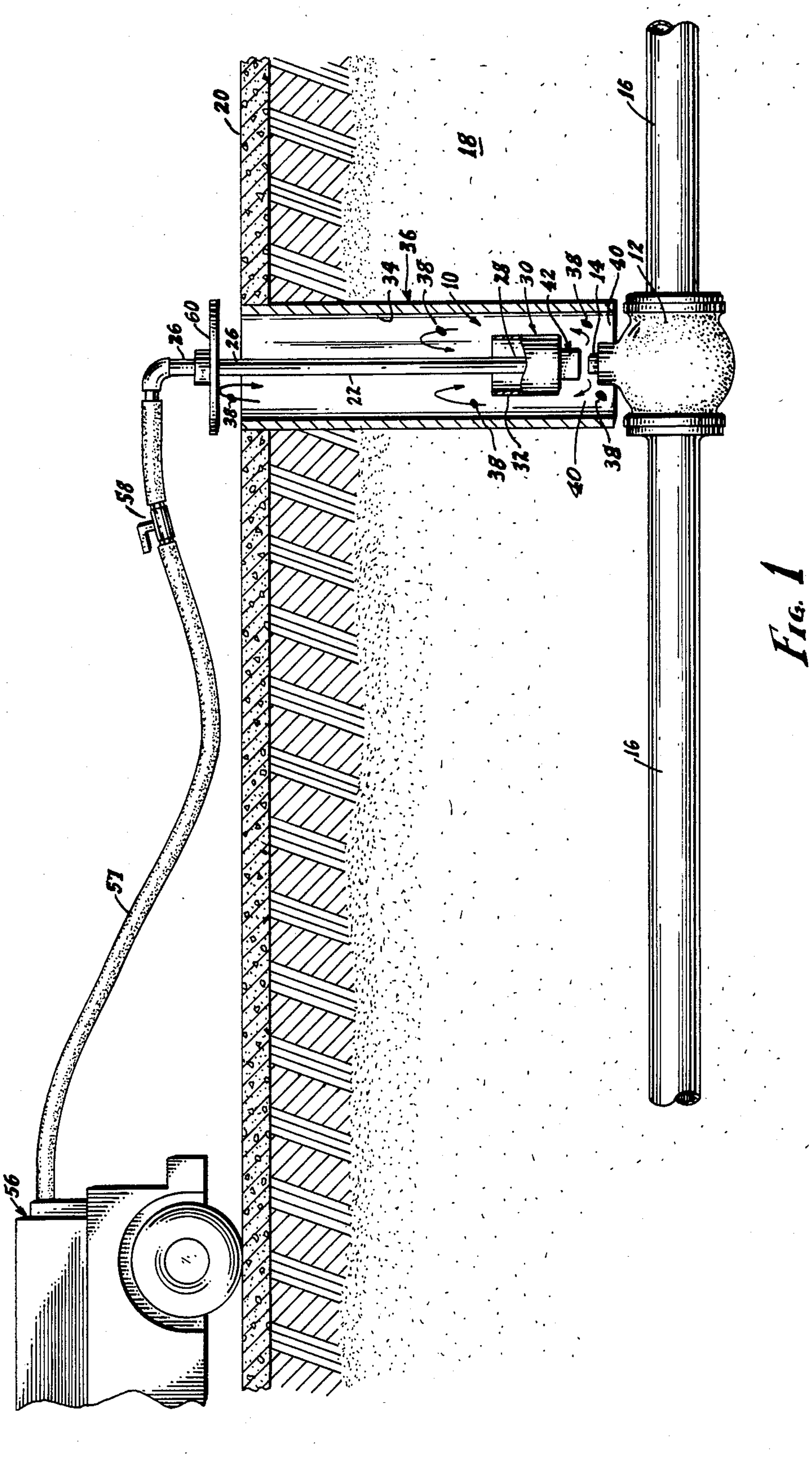
FIG. 1 is a pictorial view of a device according to concepts of the present invention, in its use of cleaning a valve box or cistern preparatory to turning the piping system's valve control, the view being shown partly in vertical cross-section.
Figure 2:
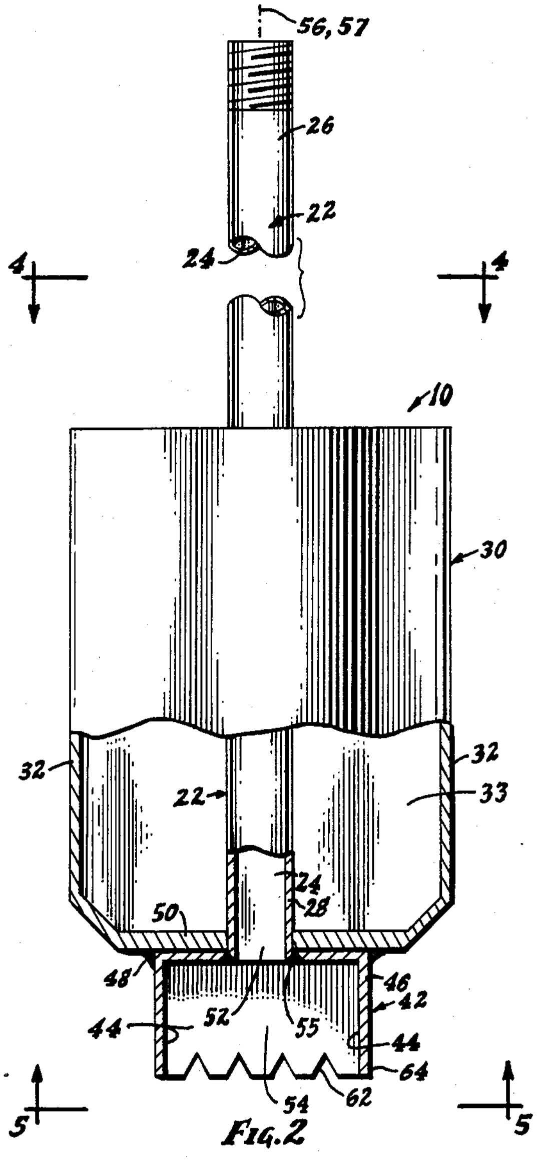
FIG. 2 is a transverse vertical cross-sectional view thereof, generally being a cross-sectional view of a detail nature particularly illustrating the basket and socket components of the unit.

As shown in the drawings, the inventive concepts provide a combination device 10, i.e., a combination cleaner and actuator device 10 for a remote valve 12 having a remotely-located access valve control body 14, particularly as would be the situation of an underground valve 12 in an underground water-supply system diagrammatically indicated by reference numeral 16.

(For illustrating the use of the device 10, it is shown in a typical setting or situation of use, the ground being shown at 18, and the surface of the ground at 20.)

The valve-portion 14 is the movable member for the valve 12, and it is movable (usually by a rotational movement) to provide whatever control is desired for the water line or whatever is the underground liquid whose movement is the subject of control by the valve 12.

Perhaps the most apparent component of the overall device 10 is a pipe or tube body member 22 having a hollow bore 24; and the pipe or tube 22 is of elongated nature, i.e., it is of a length such that its upper end 26 may be grasped by a workman at an access position remote from the valve 12 and the valve control body 14, usually of course an access position of the workman standing on the surface 20 of the ground 18, while the lower end 28 of the tubular component 22 is operatively close to the valve control body 14 to achieve the control-cleaning and control-actuation which is the task here to be achieved, and which is greatly facilitated by the device 10 of this invention.

Provided adjacent the lower end 28 of the pipe or tube 22 is an upwardly-open basket member 30, and the spacing of its walls 32 from the tube 22 provides an upwardly open receptacle region 33, which together with the walls 32 are of lesser overall diametrical size than is the inside diameter of the wall 34 of the associated valve box or cistern 36 which has been provided in the ground 18 to achieve access to the remote valve control body 14. And even though the valve box or cistern 36 helps the access to the valve control body 14 kept generally open for access purposes, it has already been mentioned that debris 38 of various kinds somehow gets into the lower portion 40 of the valve box or cistern 36, making difficult full access to the valve control body 14, especially enough access to permit reaching the valve control body 14 with a torque tool for manipulation of the valve control body 14.

The lower end of the pipe or tube 22, below the basket member 30, is provided with a dual-purpose downwardly-open socket member 42, a main purpose of which is for the grasping and applying torque for the operative manipulation of the valve control body 14; and although the socket member 42 performs other functions as specified herein, the socket member 42 has inner walls 44 generally of the shape and size as the valve control body 14, for imparting a wrench-like twisting of the valve control body 14, but that mechanical effect is only a part of the functions of the socket member 42.

That is, the socket member contributes toward the debris-cleaning operativity of the device 10; and thus it will be noted that the socket member 42 is open to communication with the bore 24 of the pipe or tube 22. That is, the upper end portion 46 of the socket member 42 is shown as welded as by welding 48 to the bottom wall 50 of the basket member 30; but that bottom basket wall 50 is discontinuous along its central portion reached by the tubing 22, leaving a hole 52 communicating the bore 24 of tubing 22 with the interior region 54 of socket member 42, i.e., the region between or inwardly of the socket walls 44.

Adjacent the hole 52 in the bottom basket wall 50, there is shown a weld 55 affixing the socket 42 to the lower end 28 of the tube 27.

There are schematically shown air-pressure means 56 (FIG. 1) acting through a flexible conduit 57 attached to the top 26 of tube 22, which provide means to supply the bore 24 of the pipe or tube 22 with compressed air, of a significant quantity and pressure to achieve the cleaning operativity here needed.

A control for the compressed air is schematically shown at 58.

More particularly, in view of the various details of these co-operating components, it will be seen that the arrangement of pipe or tube 22, its supply of compressed air by the air supply means 56/57, the basket member 30, and the socket member 42 all co-operate to provide that with the pipe or tube 22 positioned into the associated valve box or cistern 36, and with compressed air being supplied to the bore 24 of the pipe or tube 22, the air will emerge from the socket member 42 and act to disturb and move debris 38 from the region of the valve control body 14, and impinge against and flow along the valve control body 14; and thereby will be achieved and provided a cleaning function with respect to the valve control body 14 sufficient that the socket 42 may be lowered onto the valve control body 14 to permit control manipulation of the valve control 14 by the socket 42, i.e., as the workman performs the control manipulation of the pipe or tube 22, the debris 38 having been caused by the compressed air emerging from the socket member 42 to move about in the valve box or cistern 36 whereupon it will eventually fall into the basket member 30 which serves as a receptacle 33 within the cistern wall 34.

Figure 5:
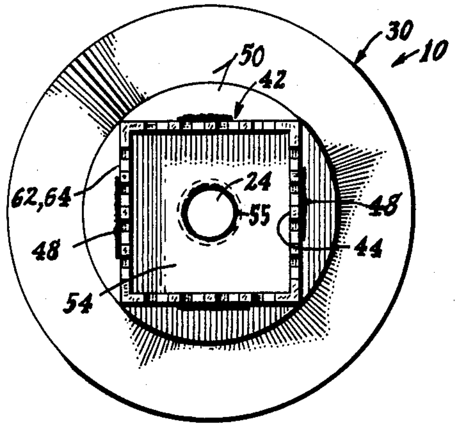
FIG. 5 is an upwardly-looking bottom view of the device, generally as taken by View-line 5—5 of FIG. 2.
Figure 6:
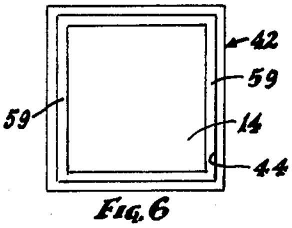
FIGS. 6 and 7 are diagrammatic illustrations of the nature and effects of the over-size characteristic of the socket member, illustrating diagrammatically in FIG. 6 that oversize nature as providing a path for the flow of valve-cleaning air, yet FIG. 7 illustrating the socket member being able to impart a valve-control torque to the piping system's valve's control body.

The socket member 42 (noting, e.g. FIGS. 5, 6) is formed so that its inner walls 44 have a polygonal shape generally and operatively corresponding to that of the valve control body 14 of the associated valve 12; and as shown the socket member 42 (walls 44) is generally square, corresponding to the square shape of the valve control body 14.

Figure 3:
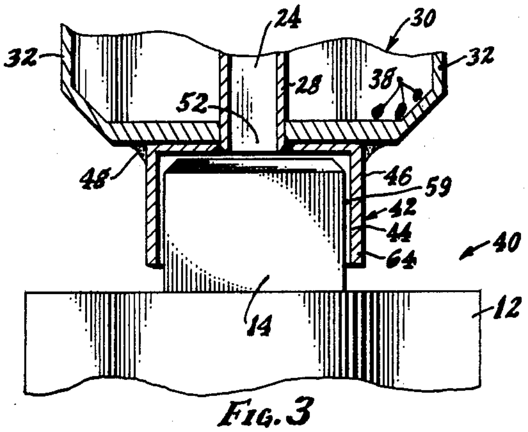
FIG. 3 is a detail cross-sectional view of the lower portion of the device, after the valve-area cleaning operativity has been sufficiently accomplished that the socket member could be used to controllably engage the valve control body or "key nut" member, this view being generally like FIG. 2 except showing that valve-control engagement by the device's socket member.
Figure 4:
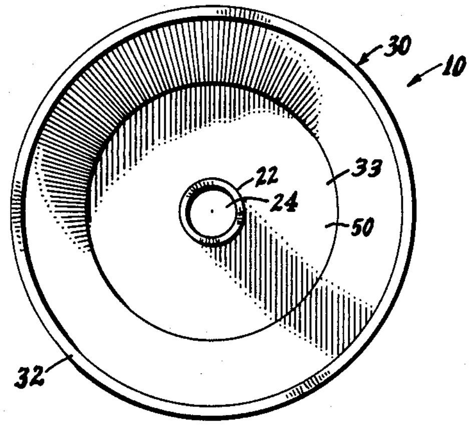
FIG. 4 is a horizontal downwardly-looking plan view of the device, generally as shown taken by View-line 4—4 of FIG. 2.
Figure 7:
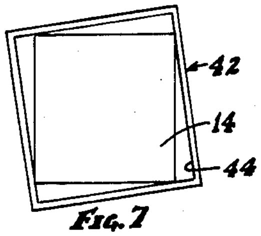

However (noting FIGS. 3, 6), it will be noted that the socket 42 (walls 44) is sufficiently larger than the valve control body 14 to provide space 59 accommodating sufficient air passage between the valve control body 14 and the socket 42 as to permit air forced through the tubing bore 24 and hole 52 to operatively achieve a cleaning operativity of the valve control body 14, yet the socket 42 (walls 44) is small enough to assure a non-slip operativity of the socket 42 (walls 44) as it is rotated to rotatably manipulate the valve control body 14 (FIG. 7).

Also as shown there is provided a deflector member 60 carried by the pipe or tube 22 adjacent its upper end 26 for deflecting debris 38 from being forced out of the associated valve box or cistern 36, and baffling the debris 38 so as to achieve its falling back into the valve box or cistern 36 for being eventually caught in the basket member 30 as a receiver 33.

The illustrative embodiment also shows that the socket member 42 is provided with notches 62 extending upwardly from its lower end 64 of the walls 44 of the socket member 42, these notches 62 providing openings for accommodating a plentiful supply of air emerging from the space 59 between the socket member 42 (walls 44) and the valve control body 14 for achieving substantial cleaning of the valve control body 14 yet providing that the socket 42 has ample depth so that its walls 44 reach over and along the valve control body 14 to maximize its control-operative abutment with the valve control body 14.

SUMMARY

It is thus seen that this combination device as achieved according to the inventive concepts provides a desired and advantageous device, yielding the advantages of both a cistern cleaner and a valve control actuator, the concepts achieving in this novel combination a device and advantages not achieved by prior art devices even though they may have had certain of the concepts individually although not in the novel combination here achieved, by which a single manipulative procedure achieves both cistern cleaning and valve actuation of a remotely accessible or underground control valve.

Accordingly, it will thus be seen from the foregoing description of the invention according to this illustrative embodiment, considered with the accompanying drawings, that the present invention provides new and useful concepts in combination, which provide and achieve a novel and advantageous tool or device, providing characteristics and advantages of convenience, labor-saving, safety of the workman, ease of control from a convenient position of the user, one-person maneuverability and operativity, etc., yielding desired advantages and characteristics, and accomplishing the intended objects, including those hereinabove pointed out and others which are inherent in the invention.

Modifications and variations may be effected without departing from the scope of the novel concepts of the invention; accordingly, the invention is not limited to the specific embodiment or form or arrangement of parts herein described or shown.

I claim:

1. A cleaner and actuator device for a remote valve having a remote access valve control body, comprising:

a pipe or tube body member having a hollow bore, and being of a length such that its upper end may be grasped by a workman at an access position remote from the valve control body, and its lower end is operatively close to the valve control body to achieve the control-cleaning and control-actuation specified below, there being provided adjacent the lower end of the pipe or tube an upwardly-open basket member, it being of lesser overall diametrical size than the inside diameter of the associated valve box or cistern which has been provided to achieve access to the remote valve control body, the lower end of the pipe or tube, below the said basket member, being provided with a downwardly-open socket member for operatively manipulating the valve control body, the socket member being open to communication with the bore of the pipe or tube, and there being means provided to supply the bore of the pipe or tube with compressed air, the arrangement of pipe or tube, its supply of compressed air, the basket member, and the socket member all co-operating to provide that with the pipe or tube positioned into the associated valve box or cistern, and with compressed air being supplied to bore of the pipe or tube, the air will emerge from the socket member and act to disturb and move debris from the region of the valve control body, and impinge against and flow along the valve control body, thereby providing a cleaning function with respect to the valve control body sufficient that the socket may be lowered thereonto to permit control manipulation of the valve control body by the socket as the workman may perform manipulation of the pipe or tube, the debris having been caused by the compressed air emerging from the socket member to move about in the valve box or cistern and eventually to fall into the basket member.

2. The invention as set forth in claim 1, in a combination in which the socket member is a polygonal shape generally corresponding to that of the valve control body of the associated valve.

3. The invention as set forth in claim 2, in which the socket member is generally square.

4. The invention as set forth in claim 2, in a combination in which the socket is sufficiently larger than the valve control body to accommodate sufficient air passage between the valve control body and the socket as to permit the air to operatively achieve a cleaning operativity of the valve control body, yet small enough to assure a non-slip operativity of the socket as it is rotated to rotatably manipulate the valve control body.

5. The invention as set forth in claim 1, in a combination in which there is provided a deflector member carried by the pipe or tube adjacent its upper end, for deflecting debris from being forced out of the associated valve box or cistern, and baffling such debris so as to achieve its falling back into the valve box or cistern for being caught in the basket member.

6. The invention as set forth in claim 1, in which the socket member is provided with notches extending upwardly from its lower end, providing openings for accommodating a plentiful supply of air emerging from the space between the socket member and the valve control body for achieving substantial cleaning of the valve control body, yet providing that the socket has ample depth so that its walls reach over and along the valve control body to maximize control-operative abutment therewith.

* * * * *

UNITED STATES PATENT AND TRADEMARK OFFICE
CERTIFICATE OF CORRECTION

PATENT NO. : 4,643,218

DATED : February 17, 1987

INVENTOR(S) : Robert L. Reed, Jr.

It is certified that error appears in the above-identified patent and that said Letters Patent is hereby corrected as shown below:

Abstract, line 3 and 4, cancel "having"

Col. 1, l. 67: Change "and" to: -- end --

Col. 2, l. 38 and 39: Change "novel signboard mounting" to: -- invention --

Col. 4, l. 19: Change "27" to "22"

Col. 5, l. 51: Change "I claim": to: -- The Claims --

Col. 6, l. 17: before "bore" insert: -- the --

Signed and Sealed this

Twenty-seventh Day of October, 1987

*Attest:*

DONALD J. QUIGG

*Attesting Officer*

*Commissioner of Patents and Trademarks*